S. B. COOPER.
Gate.
No. 63,861. Patented April 16, 1867.
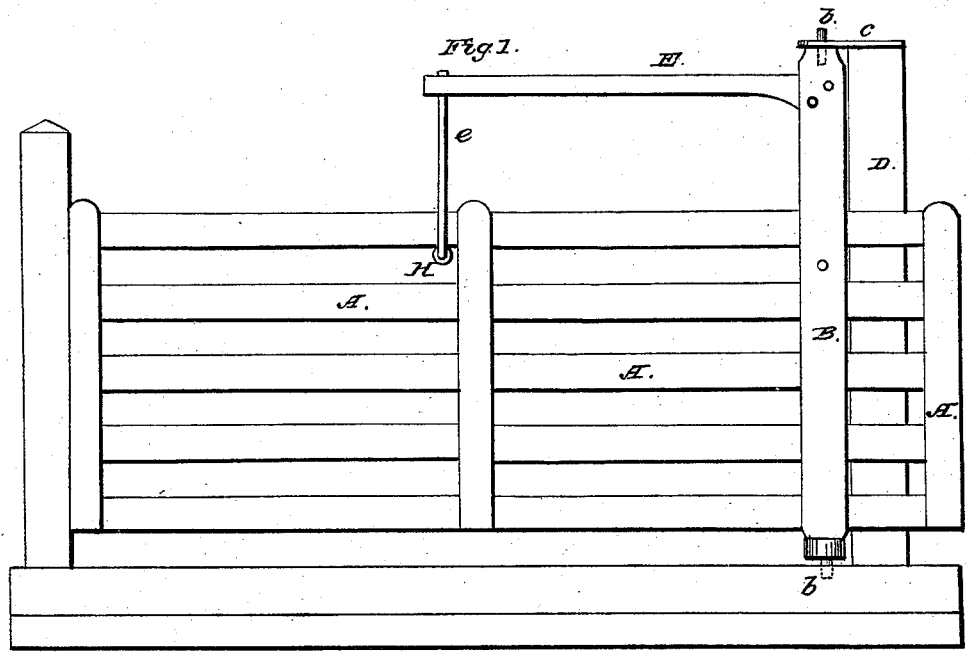
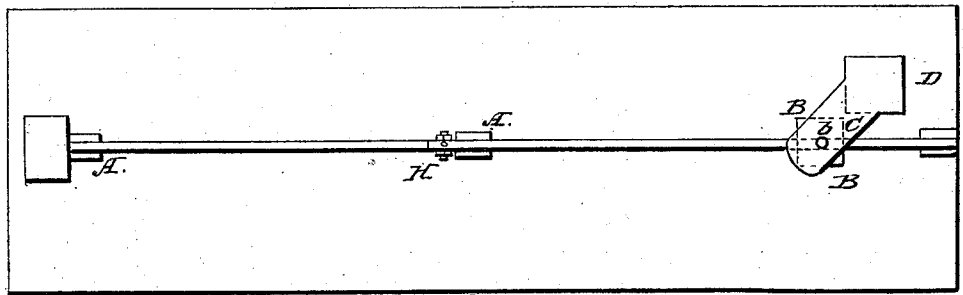
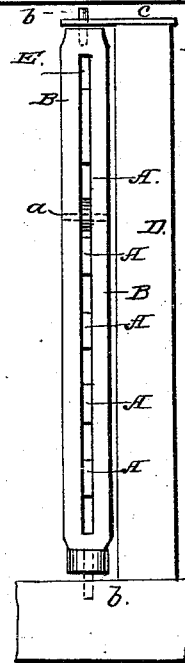

United States Patent Office.

SAMUEL B. COOPER, OF BELOIT, WISCONSIN, ASSIGNOR TO HIMSELF AND RICHARD TATTERSHALL, OF THE SAME PLACE.

Letters Patent No. 63,861, dated April 16, 1867.

IMPROVEMENT IN FARM GATES.

The Schedule referred to in these Letters Patent and making part of the same.

TO ALL WHOM IT MAY CONCERN:

Be it known that I, SAMUEL B. COOPER, of the city of Beloit, in the county of Rock, and State of Wisconsin, have invented certain new and useful improvements in Farm Gates; and I do hereby declare that the following is a full and exact description thereof, reference being had to the accompanying drawings, and to the letters of reference marked thereon and making a part of this specification.

Figure 1 is a perspective view of the gate complete.

Figure 2 is a top sectional view; and

Figure 3 is a rear sectional view taken in the line of A to B from the right of the gate, fig. 1, and showing the slot in the post B, and the fence-post D.

Similar letters of reference indicate like parts in all the figures.

The drawings fully explain the character of my invention.

A represents the frame of the gate; B the revolving slotted post; $a$ and H are pulleys on which the gate runs freely from right to left and *vice versa*, through the slotted post in opening and closing. E and $e$ form a brace or support for the gate pendent from and attached to the said revolving post B. $b$ are gudgeons to the same, and C is the cap connecting said post to the fence-post D. The gate is operated by running it to the right on the pulleys $a$ and H, and swinging it forward into the lane or field, the post B being arranged and suited to that mode of manipulation. By elevating the pulleys $a$ and H the gate may be raised to any suitable height to avoid deep snow or drifts. The gate is made fast to the fence-post in front, when closed, by any convenient device. Simplicity and cheapness will recommend this improvement in farm gates to general favor.

What I claim as my invention, and desire to secure by Letters Patent, is—

1. I claim broadly the revolving slotted post B, for the purpose set forth.
2. I claim the brace E $e$, and pulley H for the purpose specified; and
3. I claim an improved farm gate, in combination with the revolving slotted post B, brace E and $e$, pulleys H and $a$, gudgeons $b$, cap C, and fence-post D, as herein set forth for the purpose specified.

SAMUEL B. COOPER.

Witnesses:
H. W. COOPER,
D. W. C. CASTLE.